US012160625B2

(12) United States Patent
Hess et al.

(10) Patent No.: US 12,160,625 B2
(45) Date of Patent: *Dec. 3, 2024

(54) TRANSPORT STREAM AUTOMATIC CHANGE OVER

(71) Applicant: Viacom International Inc., New York, NY (US)

(72) Inventors: Jeff Hess, New York, NY (US); Jonathan Edlin Clegg, New York, NY (US); Scott Danahy, New York, NY (US); Gregg William Riedel, New York, NY (US)

(73) Assignee: VIACOM INTERNATIONAL INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/469,938

(22) Filed: Sep. 19, 2023

(65) Prior Publication Data

US 2024/0007692 A1 Jan. 4, 2024

Related U.S. Application Data

(63) Continuation of application No. 18/063,573, filed on Dec. 8, 2022, now Pat. No. 11,812,077, which is a (Continued)

(51) Int. Cl.
*H04N 21/242* (2011.01)
*H04N 21/234* (2011.01)
(Continued)

(52) U.S. Cl.
CPC ..... *H04N 21/242* (2013.01); *H04N 21/23406* (2013.01); *H04N 21/23608* (2013.01); *H04N 21/2665* (2013.01); *H04N 21/8547* (2013.01)

(58) Field of Classification Search
CPC .......................... H04N 21/242; H04N 21/8547
See application file for complete search history.

(56) References Cited

U.S. PATENT DOCUMENTS

2009/0172200 A1* 7/2009 Morrison ............. G10H 1/0058
709/248
2014/0280752 A1* 9/2014 Seastrom ................ H04L 65/80
709/219

(Continued)

*Primary Examiner* — Michael H Hong
(74) *Attorney, Agent, or Firm* — Fay Kaplun & Marcin, LLP

(57) ABSTRACT

A device, system, and method perform an automatic change over for transport streams. The method is performed at an output server. The method includes selecting a first transport stream. The method includes generating a first portion of an output based on the first transport stream. The method includes selecting a second transport stream. The method includes determining a frametime to synchronize first packets of the first transport stream to second packets of the second transport stream. The frametime is based on a start time of a content item included in the first transport stream and the second transport stream and a completed progression of the content item using the first transport stream. The method includes determining a location in the second transport stream based on the frametime. The method includes generating a second portion of the output based on the second transport stream starting at the location.

17 Claims, 7 Drawing Sheets

Related U.S. Application Data continuation of application No. 17/304,710, filed on Jun. 24, 2021, now Pat. No. 11,553,225, which is a continuation of application No. 16/194,479, filed on Nov. 19, 2018, now Pat. No. 11,076,182.

(51) Int. Cl.
*H04N 21/236* (2011.01)
*H04N 21/2665* (2011.01)
*H04N 21/8547* (2011.01)

(56) References Cited

U.S. PATENT DOCUMENTS

| | | | |
|---|---|---|---|
| 2014/0375889 A1* | 12/2014 | Cho | H04N 5/268 348/706 |
| 2016/0057721 A1* | 2/2016 | Chandrashekar | H04W 84/00 370/350 |

* cited by examiner

TRANSPORT STREAM AUTOMATIC CHANGE OVER

PRIORITY DATA

The present application is a Continuation of U.S. patent application Ser. No. 18/063,573 filed on Dec. 8, 2022, now U.S. Pat. No. 11,812,077; which is a Continuation of U.S. patent application Ser. No. 17/304,710 filed on Jun. 24, 2021, now U.S. Pat. No. 11,553,225; which is a Continuation of U.S. patent application Ser. No. 16/194,479 filed on Nov. 19, 2018, now U.S. Pat. No. 11,076,182; the entire disclosure of the above application(s)/patent(s) is expressly incorporated herein by reference.

BACKGROUND INFORMATION

A television program may be broadcast and shown without interruption or with other content (e.g., advertisements, graphics, etc.) interspersed between segments of the television program, integrated within the television program, etc. The broadcast may be seen by viewers in a variety of different manners. In a first example, a television program may be broadcast to viewers using antennas, cables, satellites, etc. In a second example, the television program may be broadcast to viewers using a streaming service through, for example, a web site, a mobile video provider, etc. Regardless of the means by which a television program is broadcast, the entities involved in the broadcast (e.g., hereinafter referred to as "broadcaster") may utilize measures to ensure that the broadcast is intact and being shown as intended. For example, broadcasters earn revenue by advertisements being played out in their entirety. Thus, the operation of the broadcast system without interruption is of vital importance. The broadcast system is configured to show a broadcast even when individual components of the broadcast system fail. For example, a backup component providing redundant data may be used.

In one approach to ensure that a broadcast system is operational even when components may stop working, a plurality of machines that produce the same broadcast (e.g., for a channel) and a switch that selects between the machines may be used in the broadcast system. The machines may generate serial digital interface (SDI) outputs in which a primary machine provides a primary SDI output and a secondary machine provides a secondary (e.g., backup) SDI output. The switch may select the primary SDI output for the broadcast and switch to the secondary SDI output when the primary output encounters an issue (e.g., the primary machine stops working and does not generate the primary SDI output). As those skilled in the art will understand, the broadcast system utilizing SDI and SDI related features requires physical components for an interaction to be achieved. For example, a physical device (e.g., SDI switcher) or card may enable one of the SDI outputs to be selected for broadcast. When switching between the outputs, it is desirable to effect a "clean switch," where both outputs are precisely synchronized and a switch between the outputs is seamless, with no audio/visual/metadata glitches, with no artifacts present, etc.

When playout of a broadcast is performed using a cloud implementation or a virtual machine, the broadcast system cannot be configured to rely on SDI and a move from SDI to an Internet Protocol (IP) stream may be used. However, current industry implementations of transport stream playout do not incorporate a clean switch from an output of a main playout server to an output of a backup playout server or vice versa. Thus, when a failure of a playout server occurs in a broadcast system based on a transport stream, the broadcast may not be "clean" (e.g., seamless in the switch, free from artifacts, free from glitches, etc.). Those skilled in the art will understand the importance for synchronization of switching from one transport stream to another transport stream. Conventional approaches do not provide an effective solution for this transport stream switch as the switch is particularly difficult to achieve in a clean manner to achieve a clean switch.

SUMMARY

The exemplary embodiments are directed to a method performed at an output server for an automatic change over for transport streams. The method comprises receiving a plurality of transport streams and selecting a first one of the transport streams. The method comprises generating a first portion of an output based on the first transport stream. The method comprises selecting a second one of remaining ones of the transport streams. The method comprises determining a frametime to synchronize first packets of the first transport stream to second packets of the second transport stream. The frametime is based on a start time of a content item included in the first transport stream and the second transport stream and a completed progression of the content item using the first transport stream. The method comprises determining a location in the second transport stream based on the frametime and generating a second portion of the output based on the second transport stream starting at the location.

The exemplary embodiments are directed to an output server comprising a transceiver and a processor. The transceiver is configured to receive a plurality of transport streams. The processor is configured to select a first one of the transport streams and generate a first portion of an output based on the first transport stream. The processor is further configured to select a second one of remaining ones of the transport streams and determine a frametime to synchronize first packets of the first transport stream to second packets of the second transport stream. The frametime is based on a start time of a content item included in the first transport stream and the second transport stream and a completed progression of the content item using the first transport stream. The processor is further configured to determine a location in the second transport stream based on the frametime and generate a second portion of the output based on the second transport stream starting at the location.

DETAILED DESCRIPTION

Figure 1:
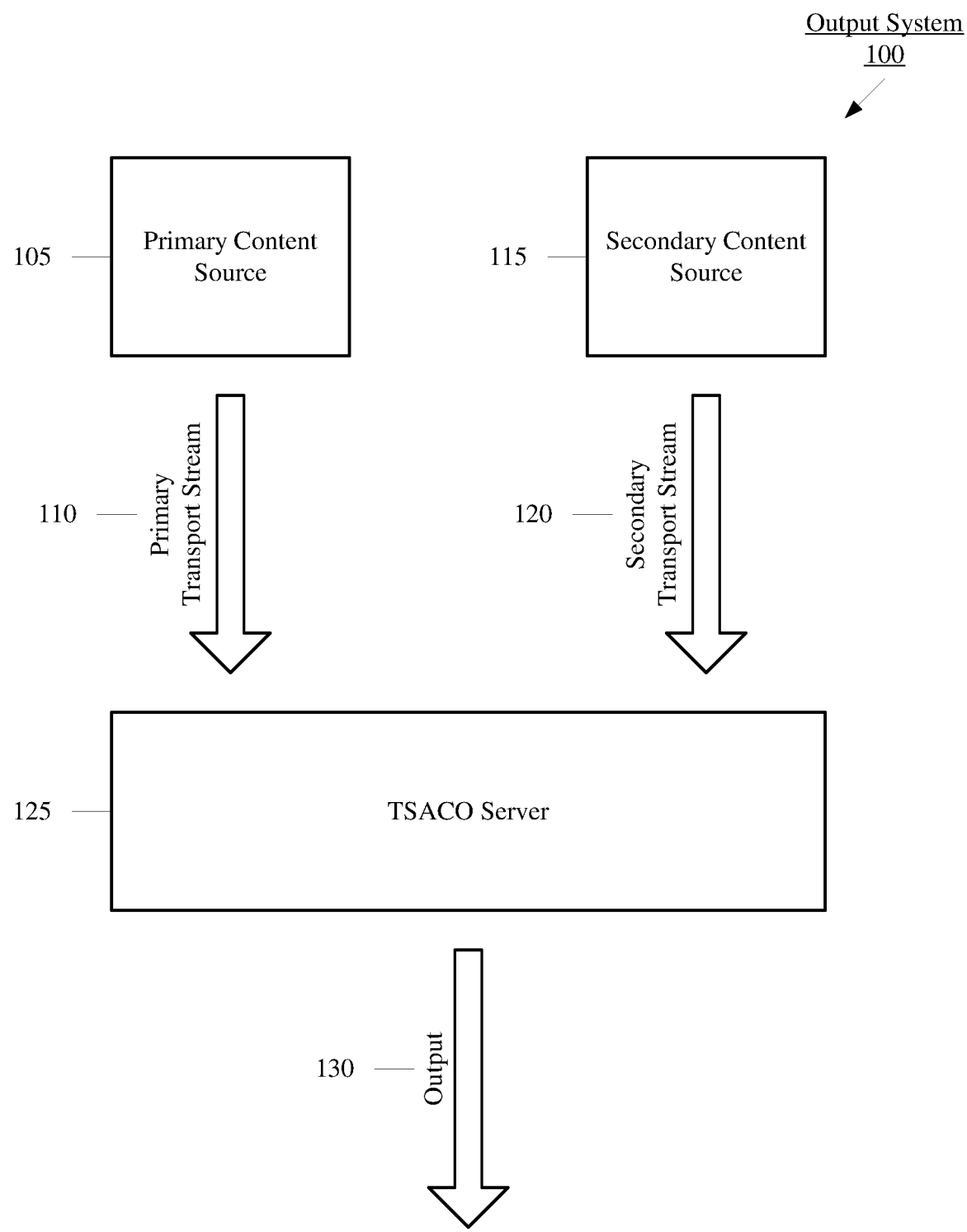
FIG. 1 an exemplary output system according to various exemplary embodiments described herein.

The exemplary embodiments may be further understood with reference to the following description and the related appended drawings, wherein like elements are provided with the same reference numerals. The exemplary embodiments are related to a device, system, and method to perform an automatic change over from a first transport stream to a second transport stream in a clean manner. The exemplary embodiments provide a mechanism that implements a switcher in a broadcast system involving transport streams to achieve an automatic change over to a backup for a transport stream based broadcast.

Initially, the exemplary embodiments are described with regard to transport streams. However, the use of transport streams is only exemplary. The exemplary embodiments may also be utilized in other formats or types of streams in which data is transmitted with characteristics corresponding to transport streams. Thus, the use of transport streams is for illustrative purposes and the exemplary embodiments may be implemented for other types of data transmission formats.

The exemplary embodiments are directed to transport streams and transmitting data for content (e.g., media content). Those skilled in the art will understand that transport streams (e.g., an MPEG transport stream) may relate to a standardized format to transmit various types of data (e.g., audio, video, program association tables (PATs), program map tables (PMTs), etc.). The transport stream may be implemented in different types of broadcast systems (e.g., Internet Protocol television (IPTV), Digital Video Broadcasting (DVB), etc.). Accordingly, the exemplary embodiments may be implemented in these types of broadcast systems and other systems that have common characteristics.

A transport stream may encapsulate a plurality of packetized elementary streams. In view of these elementary streams, the transport stream may include a PAT and/or a PMT that describes all the included elementary streams. For example, the PAT/PMT may indicate that the transport stream includes a video elementary stream that is encoded with a particular encoding for a given program identification (PID) (e.g., a number that uniquely identifies data in the elementary stream). The transport stream may further include error correction information, synchronization pattern features used to maintain a transmission integrity, etc. The transport stream may also enable features where multiple audio channels are associated with a single video channel, multiple channels are associated in a single transport stream, etc. For example, a transport stream may include a plurality of channels (e.g., channels in a channel lineup for a television provider such as a pop music channel, a country music channel, a comedy channel, etc.) that are multiplexed (muxed) together. The further information may identify these channels in a manner substantially similar to the PAT/PMT describing the elementary streams.

The transport stream may also utilize a system clock feature (e.g., a program clock reference (PCR)). The PCR may reside on an encoder that generates the transport stream. The PCR may be used to indicate a reference clock value or other value used to determine the reference clock value (e.g., jitter estimation). The PCR may address scenarios where a time drift exists between two devices (e.g., a transmitter of the transport stream and a receiver of the transport stream). For example, a first device may transmit audio and video (A/V) data to a second device. The first device may also transmit a header or information defining the content and a playout for the content (e.g., a frame in the A/V data is to be shown at a specific time). The PCR may address the timing issue that may exist by synchronizing the clocks of the first and second devices. For example, without synchronization, a frame that is transmitted to be played out at a specified time may encounter an issue if the specified time has already passed on the second device (e.g., creating a buffer underrun) or if the specified time has not yet happened creating a waiting time and buffer (e.g., where an extended waiting time causes a buffer overfill or buffer overrun). In an exemplary manner, the PCR may resolve the drift in clocks of multiple devices by encoding a time that the first device is utilizing such that the second device may synchronize its clock to the time of the first device.

Another feature of the transport stream is that the transport stream may be separated into sections of a predetermined size and interleaved together so that the transport stream is broadcast with a constant bitrate. In one example, the sections may be a relatively small size of 188 bytes that provides a feature of reduced latency. Although the exemplary embodiments are described with sections being 188 bytes, the mechanism according to the exemplary embodiments may be implemented where the transport stream utilizes different sizes of the sections (e.g., larger or smaller size) while still retaining the features of the mechanism provided by the exemplary embodiments. The constant bitrate leads to a consistent broadcast rate of the transport stream. If the video or audio were to fluctuate in bitrate, the multiplexer (muxer) of the transport stream may utilize padding bytes to retain the constant bitrate. As will be described in detail below, the exemplary embodiments take advantage of these features of the transport stream where a consistent predetermined size of the sections is used and a constant bitrate is maintained. Specifically, a section may correspond to a known, predetermined amount of time.

FIG. 1 shows an exemplary output system 100 according to various exemplary embodiments described herein. The output system 100 may be implemented in various broadcast systems that utilize transport streams as a basis for an output provided to a broadcast entity of a broadcast chain or viewers. The output system 100 may include a primary content source 105 providing a primary transport stream 110, a secondary content source 115 providing a secondary transport stream 120 that is interchangeable or used for switching with the primary transport stream 110 (e.g., having the same encoding parameters including audio/video format, resolution, colorspace, etc.), and a transport stream automatic change over (TSACO) server 125 receiving the primary transport stream 110 and the secondary transport stream 120 to generate an output 130. Although the exemplary embodiments are illustrated with two content sources and respective transport streams, those skilled in the art will appreciate that the output system 100 may include any number of transport streams generated by respective content sources that may be received by the TSACO server 125.

In an exemplary embodiment, the primary content source 105 and the secondary content source 115 may be associated with a common level of the broadcast chain (e.g., the same entity). The entity that is respectively associated with the primary content source 105 and the secondary content source 115 may be at any level of the broadcast chain. For example, the entity may be a content creator (e.g., producer of the content), a media corporation (e.g., a conglomerate), a provider (e.g., a cable operator, a satellite operator, etc.), etc. The mechanism according to the exemplary embodiments may be implemented in any of these levels of the broadcast chain prior to a final level including viewers. The primary content source 105 and the secondary content source 115 being used by the same entity is only for illustrative purposes. According to another exemplary embodiment, the primary content source 105 may be associated with a first entity and the second content source 115 may be associated with a second entity where the first entity and the second entity may be in the same level or a different level of the broadcast chain.

As will be described below, the primary transport stream 110 and the secondary transport stream 120 may be interchangeable with one another in regards to format, resolution, colorspace, etc. such that they may be switched for a broadcast. Thus, so long as the first and second entities are configured to provide the respective transport streams in the primary transport stream 110 and the secondary transport stream 120, respectively, to a common destination (e.g., the TSACO server 125), the entities associated with the primary content source and the secondary content source may be associated with different entities and/or residing at different levels.

In an exemplary manner of utilizing the primary content source 105 and the secondary content source 115, the entity may be a media corporation that outputs the primary transport stream 110 and the secondary transport stream 120, respectively. The media corporation may be receiving content from a source residing at a previous level in a broadcast chain. Subsequently, an appropriate encoding operation, converting operation, etc. may be used on the content to generate the primary transport stream 110 and the secondary transport stream 120. Thus, the primary content source 105 and the secondary content source 115 may be the components of the media corporation that receives the content and generates the transport streams. In generating the respective transport streams 110, 120, the content being received from the previous level in the broadcast chain is not required to remain as received and may be modified. For example, advertisements may be included in available sections, inserted between sections of the content, etc. In another example, graphics may be incorporated into the content. However, as noted above, so long as the modifications are performed substantially identically, the resulting primary transport stream 110 and the secondary transport stream 120 may be interchangeable with one another.

In a first exemplary implementation, the media corporation may provide the transport streams to the TSACO server 125 that also resides at the media corporation. In a second exemplary implementation, the media corporation may provide the transport streams to the TSACO server 125 that resides on a different, ensuing level of the broadcast chain. A following level in the broadcast chain may be a provider that receives the output 130. Regardless of where the TSACO server 125 resides, the TSACO server 125 may receive the primary transport stream 110 and the secondary transport stream 120. In generating the output 130, the TSACO server 125 may select between the primary transport stream 110 and the secondary transport stream 120. As will be described below, when a failure occurs for the transport stream that is selected, the TSACO server 125 may select or switch to a different transport stream. When only one of the primary transport stream 110 or the secondary transport stream 120 is used for the output 130, the output 130 may be based on the selected transport stream. When at least one switch is used, the output 130 may be a mix of the primary transport stream 110 and the secondary transport stream 120. The output 130 may also be generated in a dynamic manner and in real time (which may or may not be subject to a predetermined delay as those skilled in the art will understand).

The exemplary embodiments may implement the output system 100 in physical components such as the implementation described above. Thus, the output system 100 may be implemented in hardware. However, the exemplary embodiments may also implement the output system 100 in other media. The output system 100 may also be implemented as software alone, as firmware alone, or as a combination of two or more of hardware, software, and firmware. For example, as noted above, the output system 100 may be implemented in a cloud or virtual machine environment that may not rely on any particular hardware component. Accordingly, the output system 100 may be implemented in the cloud or virtual machine environment that is configured to generate the output 130. In a particular example, the output system 100 may be configured so that the output 130 is an I frame only video or video that contains P and B frames.

The output system 100 may incorporate further components of a broadcast system in a hardware, software, and/or firmware capacity. For example, the output system 100 may further include at least one of origination services, a personalization server using advertisements provided by an advertisement server, graphics provided by a graphics server, etc., a distribution cache, a content delivery network, etc. The output system 100 may include functionalities that reside in one or more of the components described above or these further components noted in an individual or distributed manner.

Figure 2:
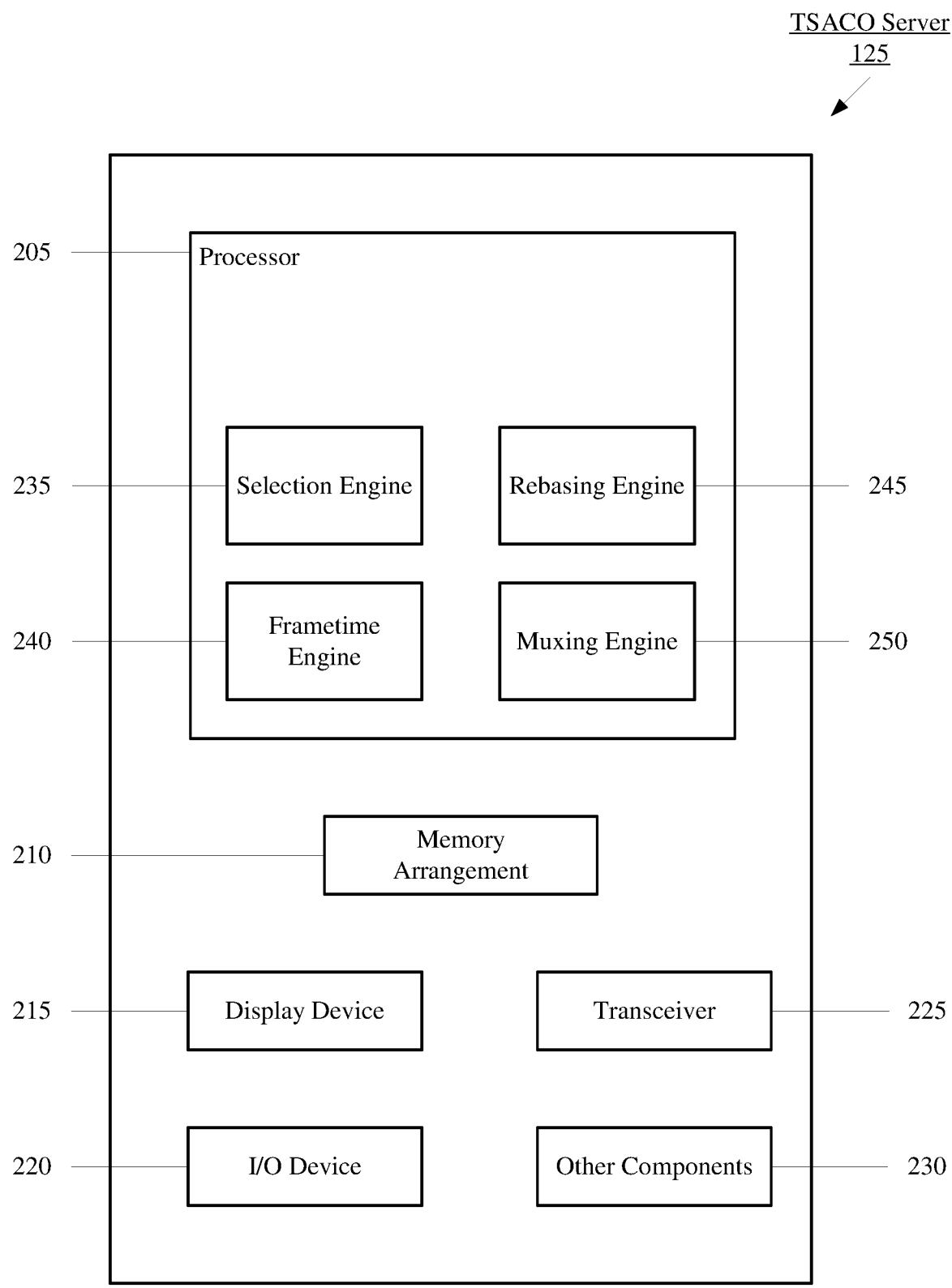
FIG. 2 shows an exemplary output server of the system of FIG. 1 according to various exemplary embodiments described herein.

FIG. 2 shows an example of the TSACO server 125 of the output system 100 of FIG. 1 according to various exemplary embodiments described herein. As noted above, the TSACO server 125 may receive the primary transport stream 110 and the secondary transport stream 120 and select the streams to generate the output 130. The TSACO server 125 is configured to execute a plurality of engines that perform functionalities to perform an automatic change over that selects a non-selected transport stream when a selected transport stream fails. As described above, when the transport streams are generated separately (albeit substantially identical to be interchangeable), there may be a drift in time between the transport streams 110, 120. The TSACO server 125 may perform this switching functionality to generate the output 130 in a clean way such that the broadcast embodied in the output 130 avoids any interruption, artifacts, or glitches despite the switch. The TSACO server 125 may include a processor 205, a memory arrangement 210, a display device 215, an input/output (I/O) device 220, a transceiver 225, and other components 230 (e.g., other mechanisms used to establish connections).

The processor 205 may be configured to execute a plurality of engines of the TSACO server 125. For example, the engines may include a selection engine 235, a frametime engine 240, a rebasing engine 245, and a muxing engine 250. The selection engine 235 may be configured to select between the primary transport stream 110 and the secondary transport stream 120. The frametime engine 240 may be configured to determine a correlation between the transport streams 110, 120 for a clean switch. The rebasing engine 245 may be configured to determine a shift used in a selected one of the transport streams 110, 120 to generate the output 130. The muxing engine 250 may be configured to generate the output 130 based on the outputs of the selection engine 235, the frametime engine 240, and the rebasing engine 245.

The above-described engines each being an application (e.g., a program) executed by the processor 205 is only exemplary. The functionality associated with the engines may also be represented as a separate incorporated component of the TSACO server 125 or may be a modular component coupled to the TSACO server 125, e.g., an integrated circuit with or without firmware. For example, the integrated circuit may include input circuitry to receive signals and processing circuitry to process the signals and other information. The engines may also be embodied as one application or separate applications or as part of one or more multifunctional programs. Accordingly, the applications may be implemented in a variety of manners in hardware, software, firmware, or a combination thereof. The exemplary embodiments may be implemented in any of these or other configurations of a server.

The memory 210 may be a hardware component configured to store data related to operations performed by the TSACO server 125. For example, the memory 210 may store a rebasing shift value that is calculated for a transport stream. The display device 215 may be a hardware component configured to show data to a user while the I/O device 220 may be a hardware component that enables the user to enter inputs. It should be noted that the display device 215 and the I/O device 220 may be separate components or integrated together such as a touchscreen. The display device 215 and the I/O device 220 may enable an administrator to manage the transport stream automatic change over mechanism according to the exemplary embodiments. The transceiver 225 may be a hardware component configured to establish a connection with components of entities involved in a broadcast chain.

As described above, the exemplary embodiments may also be implemented in a cloud or with virtual machines. Thus, the description herein with regard to the TSACO server 125 being embodied in hardware and/or in the components of the TSACO server 125 is only for illustrative purposes. When implemented in a cloud or with virtual machines, the functionalities described below for the components and engines of the TSACO server 125 may be instructions that may cause other components or other devices to perform corresponding operations. For example, the functionalities of the engines 235-250 of the processor 205 may represent respective instructions for one or more components/devices to achieve the intended operation. In another example, the transceiver 225 may represent a connection mechanism for components of entities of the broadcast chain and/or components/devices within an entity of the broadcast chain to communicate.

As described above, the exemplary embodiments provide a clean change over performed automatically between a selected first transport stream to a second one of at least one further available transport stream. For example, the change over or switch may be performed for various reasons including a failure of the first transport stream, an anticipated switch, etc. In an exemplary embodiment, the TSACO server 125 may receive the primary transport stream 110 and the secondary transport stream 120 which are de-multiplexed (demuxed) into a buffer. The TSACO server 125 may then re-multiplex (remux) a selected one of the transport streams into the output 130. When an issue arises for the selected transport stream used to remux into the output 130, the TSACO server 125 may switch and select another demuxed transport stream to be used in remuxing into the output 130. This switch may be performed by the TSACO server 125 such that the output 130 is generated without interruption and in a continuous manner as if no switch was performed.

The selection engine 235 may select between the primary transport stream 110 and the secondary transport stream 120. As noted above, the TSACO server 125 may receive the primary transport stream 110 and the secondary transport stream 120 (e.g., via the transceiver 225) for subsequent demuxing (e.g., by a demuxer or demuxing operation performed by the processor 205 (not shown)). The demuxed transport streams 110, 120 may be stored in a buffer (e.g., as part of the memory arrangement 210 reserved for the mechanism according to the exemplary embodiments or using a remote storage component). Thus, according to this exemplary implementation, the selection engine 235 may select one of the demuxed transport streams 110, 120 for subsequent processing. As will be described below, based on subsequent operations, the selection engine 235 may select a different, unselected transport stream to be remuxed. The selection engine 235 may determine that a selection is to be performed based on a variety of triggers. For example, the selection engine 235 may receive an indication that the primary content source 105 is deactivated (e.g., through a remote indication, by a manual entry input through the I/O device 220, etc.). In another example, the selection engine 235 may determine that the primary content source 105 is deactivated when a predetermined number of consecutive packets or a predetermined number of packets within a given time period are not received in the primary transport stream 110. Further examples of when a switch may be performed from the primary transport stream 110 may include a primary buffer associated with the primary transport stream 110 getting too low, a packet loss in the primary transport stream 110, a jitter level of the primary transport stream 110 being too high, a format change to video/audio/etc. that is unexpected, an external application program interface indicating the switch, etc. The mechanism according to the exemplary embodiments and the selection functionality of the selection engine 235 may also be configured in other manners. For example, the selection engine 235 may select the transport stream prior to demuxing.

The frametime engine 240 may determine a correlation between the transport streams 110, 120 for the selection engine 235 to perform a clean switch when selecting a different transport stream. The frametime engine 240 may utilize the features of transport streams such as the predetermined size and the constant bitrate. As will become apparent herein, the frametime engine 240 may determine a frametime in which a timestamp may be used to determine a frame of the content in the currently selected transport stream (referred to herein as the "primary transport stream") that corresponds to a frame of the content in a different transport stream to be selected to replace the currently selected transport stream (referred to herein as the "secondary transport stream"). It is noted that the use of primary and secondary for the transport streams does not connote any primacy or hierarchy to the transport streams, the terms are merely used to distinguish between a currently selected transport stream and the one or more transport streams that are not currently selected. The frametime engine 240 may determine the frametime based on a start time of an identified content item and a completed playout or progression in a buffer of that identified content item (hereinafter referred to as "completed progression"). Each content item processed by the output system 100 may include a start time or time value at which the content item commences (hereinafter collectively referred to as "start time"). As the content item progresses, using the features of transport streams, each frame may be assigned or stamped with a time value relative to the start time (hereinafter collectively referred to as a "timestamp"). This timestamp may be used to synchronize the primary content source 105 and the secondary content source 115 or synchronize the primary transport stream 110 and the secondary transport stream 120. Therefore, at the time a switch is to be performed, the frametime engine 240 may utilize the completed progression of the currently selected primary transport stream and determine a corresponding frame in the secondary transport stream to be selected. As will be described in detail below, the switch may be performed based on an I frame of the transport streams. With the transport streams 110, 120 synchronized, the corresponding frame in the secondary transport stream to be selected may coincide with the frame of the completed progression in the currently selected primary transport stream. Thus, a switch may be performed where a last frame of a currently selected primary transport stream continues with a first frame of the secondary transport stream to be selected such that the content item is output in a clean manner, seamlessly with no artifacts, glitches, etc.

The rebasing engine 245 may determine a shift used in a selected one of the transport streams 110, 120 to generate the output 130. The rebasing engine 245 may utilize a first rebasing to remux a selected transport stream (e.g., the primary transport stream 110). Thus, a first rebase value may be used on each packet of the selected transport stream to generate the output 130. When a switch to a new transport stream (e.g., the secondary transport stream 120) is performed, the rebasing engine 245 may utilize the output of the frametime engine 240 to determine a second rebase value to be used on each packet of the newly selected transport stream.

The muxing engine 250 may generate the output 130 based on the outputs of the selection engine 235, the frametime engine 240, and the rebasing engine 245. Thus, when a selection is made by the selection engine 235 for the primary transport stream 110, the rebasing engine 245 may indicate a first rebase value to be used in the remux operation. The muxing engine 250 may continue to use the first rebase value to remux the buffered demuxed primary transport stream 110 until the selection engine 235 indicates a new selection to the secondary transport stream 120. The muxing engine 250 may then receive an indication from the rebasing engine 245 for a second rebase value on which to perform the remux operation (e.g., the second rebase value being based on an output of the frametime engine 240). The muxing engine 250 may use the second rebase value to remux the buffered demuxed secondary transport stream 120. The muxing engine 250 may continue to use the second rebase value until the transport stream concludes or when a further selection is made to switch transport streams.

Figure 3:
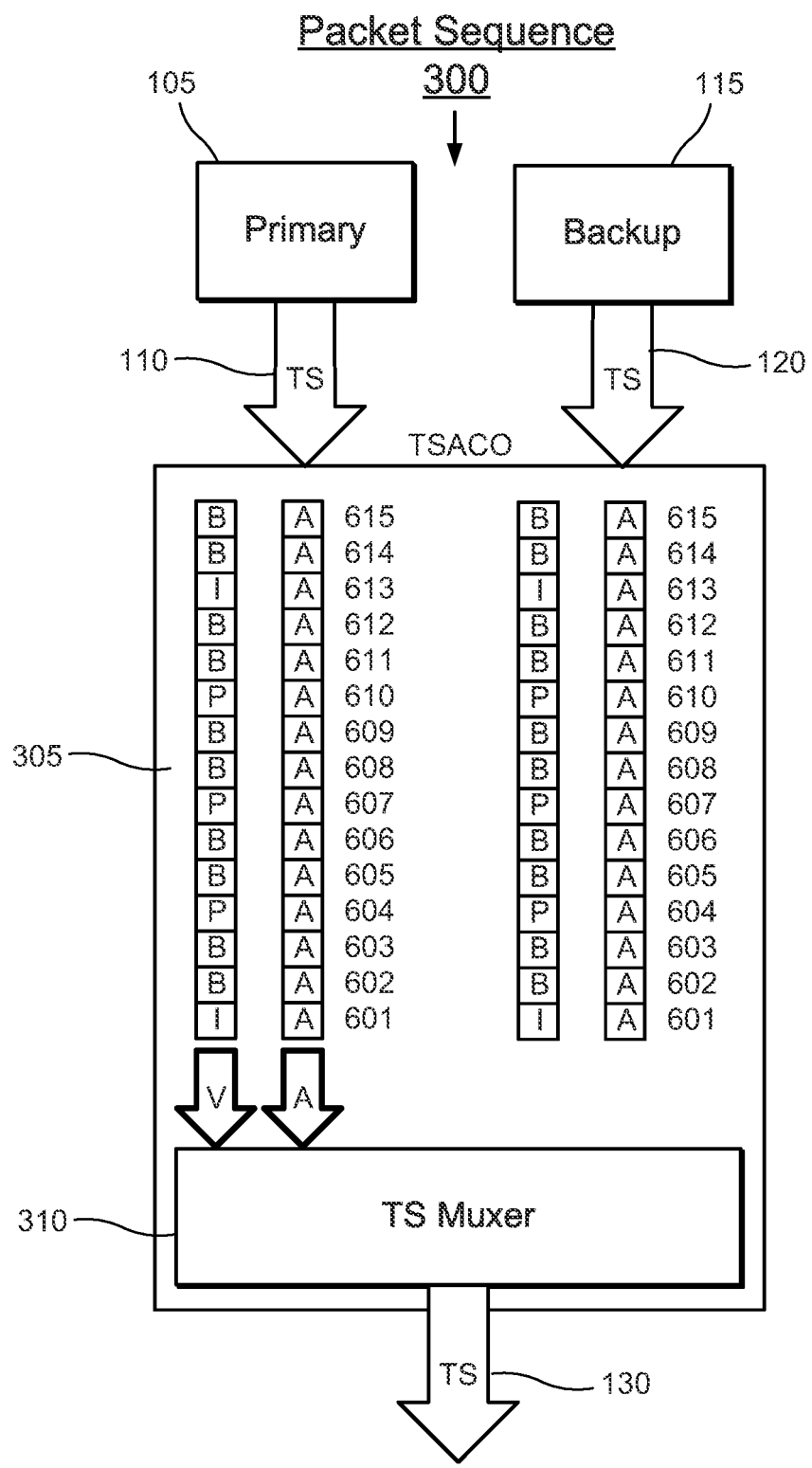
FIGS. 3-5 show exemplary packet sequences according to various exemplary embodiments described herein.
Figure 4:
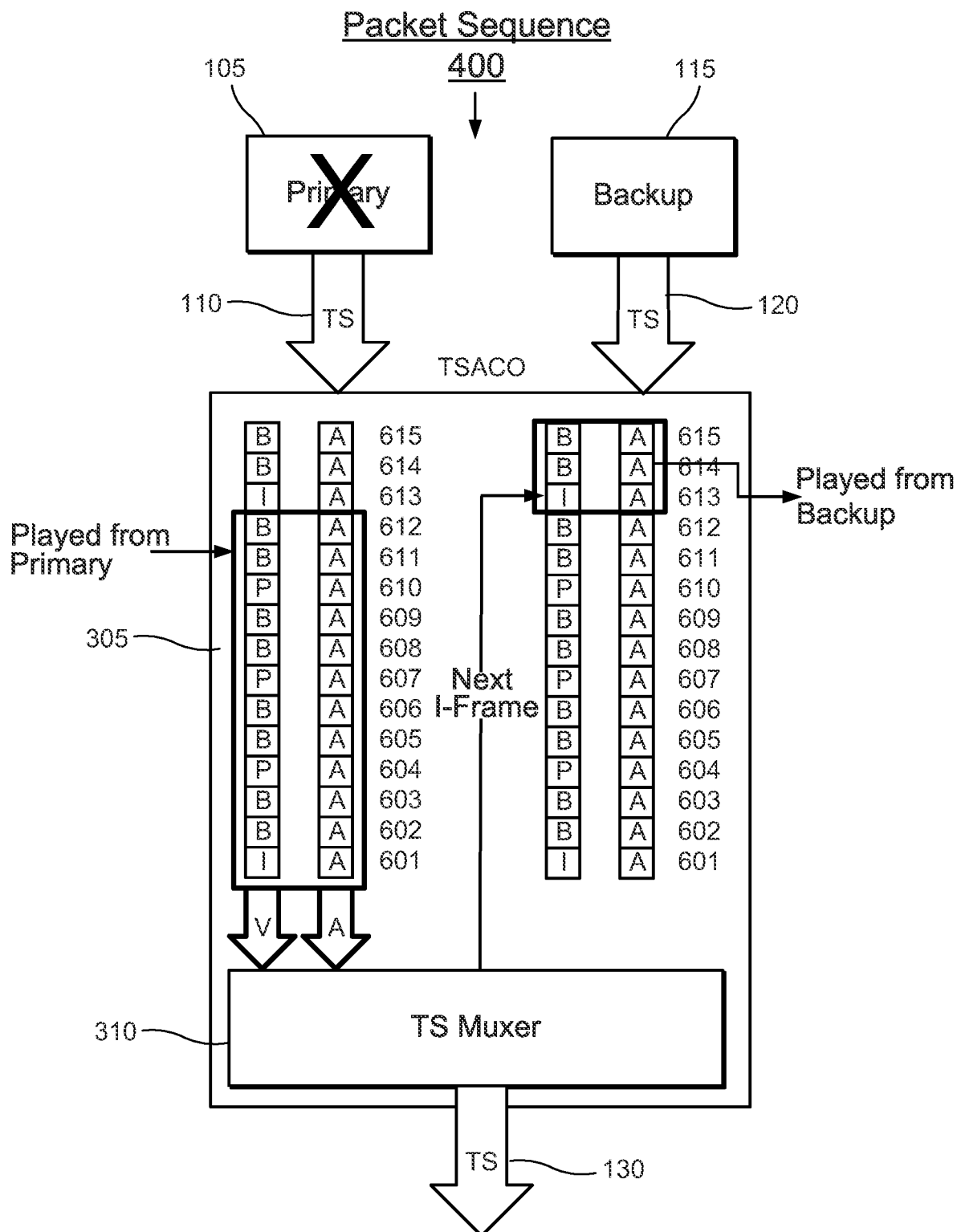
Figure 5:
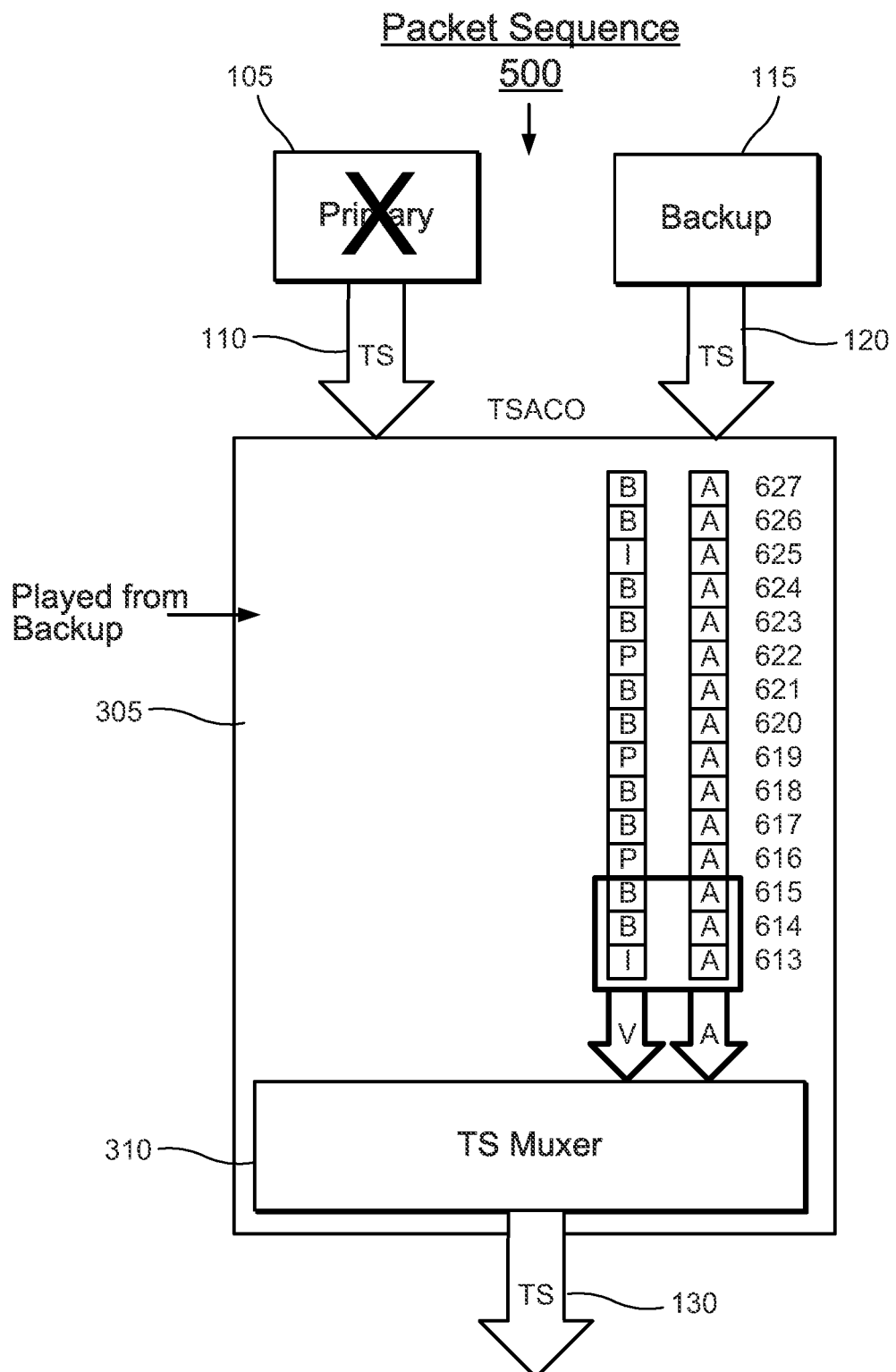

FIGS. 3-5 show exemplary packet sequences 300, 400, 500 according to various exemplary embodiments described herein. FIG. 3 shows a first packet sequence 300 in which the TSACO server 125 generates the output 130 by remuxing the buffered packets of the primary transport stream 110. FIG. 4 shows a second packet sequence 400 in which the TSACO server 125 generates the output 130 by switching from the primary transport stream 110 to the secondary transport stream 120. FIG. 5 shows a third packet sequence 500 in which the TSACO server 125 generates the output 130 by remuxing the buffered packets of the secondary transport stream 120. Thus, the packet sequence 300 shows when the primary transport steam 110 is operating successfully, the packet sequence 400 shows when the primary transport stream fails and the secondary transport stream 115 is used, and the packet sequence 500 shows the secondary transport stream 120 continuing to be used when the primary transport stream 110 remains down.

FIGS. 3-5 include the primary content source 105 outputting the primary transport stream 110, the secondary content source 115 outputting the secondary transport stream 120, the primary transport stream 110 and the secondary transport stream 120 demuxed into a buffer 305 and remuxed in a muxer 310 to generate the output 130. The packets of the transport streams 110, 120 that are buffered as illustrated as I/P/B frames (e.g., for video) and A frames (e.g., for audio) where the I/P/B frames corresponds to the A frames along a sequence (e.g., from 601 to 627). The buffer 305 being illustrated as a single buffer is only exemplary. Those skilled in the art will understand that there may be an individual buffer for each of the transport streams 110, 120.

As described above, the TSACO server 125 may utilize an I frame as a basis to perform the switch from the primary transport stream 110 to the secondary transport stream 120. For example, as shown in the packet sequence 300, the muxer 310 may receive buffered I/P/B and A frames based on the primary transport stream 110. In the packet sequence 400, there may be an indication that the primary content source 105 is no longer providing the primary transport stream 110 to the TSACO server 125. For example, the primary content source 105 may have transmitted frames 601 to 615 which have been demuxed and stored in the buffer 305. However, after frame 615, the primary content source 105 may have failed and the primary transport stream 110 may have stopped being received. The secondary content source 115 may continue to be operational and provide the secondary transport stream 120 after the primary transport stream 110 has stopped being received. As the I frames may be used as breakpoints, the muxer 310 may use the buffered frames 601 to 612 from the primary transport stream 110 to be remuxed for the output 130. Packets of the primary transport stream 110 that were buffered after the I frame breakpoint may be discarded.

In switching to the buffered frames of the secondary transport stream 120, the muxer 310 may use the last I frame from the primary transport stream 110 for which the preceding frames are complete. Accordingly, in the packet sequence 500 in which the primary content source 105 is no longer transmitting the primary transport stream 110 to be demuxed and stored in the buffer 305, the muxer 310 may use the buffered frames 613 and onward from the secondary transport stream 120 to be remuxed and used in the output 130.

The above process of switching from the primary transport stream 110 to the secondary transport stream 120 relies on an assumption that the next I frame of the secondary transport stream 120 corresponds to the I frame of the primary transport stream 110 used as a breakpoint to discontinue use in remuxing for the output 130. However, with the above failure scenario for the primary transport stream 110, there are instances when the selected I frame 613 of the secondary transport stream 120 is not the correct I frame to begin remuxing the secondary transport stream 120 for the output 130.

When considering transport streams, there is no guarantee that a particular frame number in a list of packets for a content source that is demuxed and stored in the buffer 305 corresponds to a second list of packets for a further content source that is demuxed and stored in the buffer 305. Those skilled in the art will understand that a PCR or a program timestamp (PTS) may not be used to synchronize the lists of packets for the primary transport stream 110 and the secondary transport stream 120. For example, the secondary content source 115 may have been active for a first time period, then failed during a second timer period, and became active again for a third time period. When the secondary content source 115 restarts at the third time period, the frames may be reset to a different frame number (e.g., a reference, initial frame number such as 0). Therefore, the frame number, the PCR, or the PTS may not provide a sufficient basis to ensure that the correct remuxing point is used when a switch is performed.

As described above, the frametime engine 240 may determine a frametime that allows the transport streams 110, 120 to be synchronized (e.g., a first frame in a first transport stream corresponds to a second frame in a second transport stream for a content item). For example, the frametime may be used to convert a timestamp of the primary transport stream 110 (e.g., a selected transport stream) based on a start time and a completed progression to a frame which is correlated to a frame of the secondary transport stream 120 (e.g., a newly selected transport stream) and a corresponding timestamp.

To utilize the frametime, the primary content source 105 and the secondary content source 115 may be configured to communicate with one another to perform a synchrolock operation. The synchrolock operation may entail the secondary content source 115 requesting a list of packets or frames that the primary content source 105 intends on playing out. Therefore, the primary content source 105 and the secondary content source 115 may be configured to transmit the same packets or frames to the TSACO server 125. The list may be for the packets themselves or may enumerate other types of information used to indicate the intended playout for the primary content source 105. For example, the list may be for different content items in an intended order. Each content item may be referred to as an "assist" where the list also identifies a start time for each assist or a time that the associated content item is to start.

The list may indicate that a first clip may start at a first time (e.g., in a format of hour:minute:second.frame to indicate the time with hour, minute, and second the frame indicating a number of frames after the given time). The list may then indicate that a second clip may start at a second time (e.g., hour:minute:second.frame following the first time). Using the principles of transport streams with sections of predetermined amounts of data (e.g., 188 bytes) and a constant bitrate, the frametime engine 240 may use the time and frame(s) of the start time to determine a frametime. Any content source that performs the synchrolock operation with the primary content source 105 may agree with the frametime. In this manner, the primary content source 105 and the secondary content source 115 may use the same synchronized schedule to generate the primary transport stream 110 and the secondary transport stream 120. By agreeing to play out a selected piece of content at a corresponding time, the clocks of the content sources 105, 115 may also be synchronized with regard to the transport streams 110, 120.

The frametime may also utilize existing transport stream specifications. For example, an additional communication arrangement may not be required. However, such an implementation may also be utilized for the exemplary embodiments. In utilizing existing transport stream specifications, the frametime may be inserted into an available space in the transport streams. For example, a PES header may include 128 bits that are empty. The frametime may only use, for example, 64 bits that may fit in the empty space of the PES header.

Using the frametime, the buffers for the primary transport stream 110 and the secondary transport stream 120 may include demuxed packets or frames that have a known synchronization. Thus, in remuxing a selected transport stream to generate the output 130, the frametime may enable a seamless switch to be performed. However, as noted above, timestamps may be reset when, for example, the corresponding content source is restarted. In view of the issue with timestamps, the rebasing engine 245 may provide a rebasing operation so that the timestamps corresponds to an intended time in the remuxing operation of the muxing engine 250.

Figure 6:
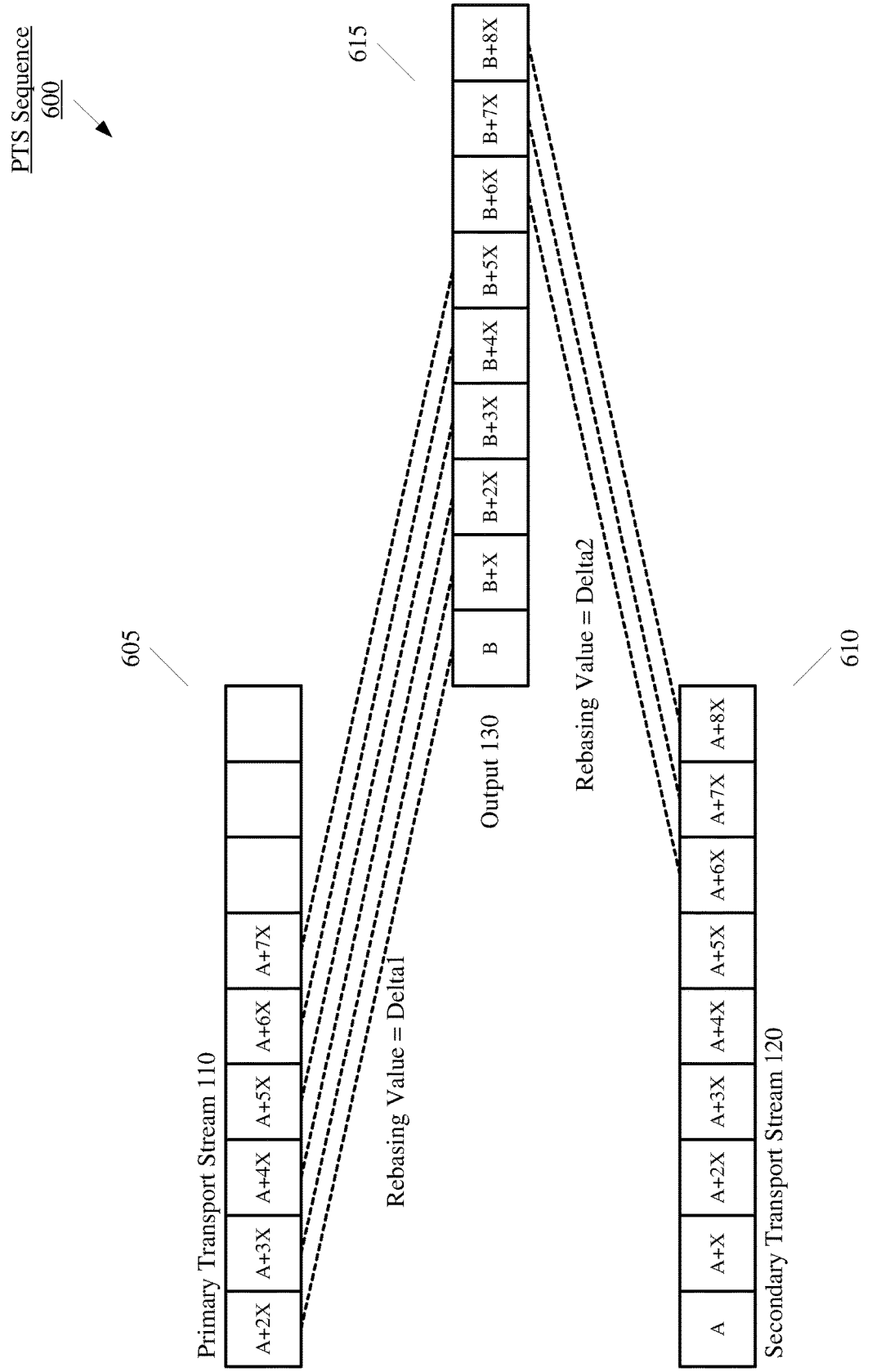
FIG. 6 shows a program timestamp sequence according to various exemplary embodiments described herein.

FIG. 6 shows a PTS sequence 600 according to various exemplary embodiments described herein. The rebasing engine 245 may be used to determine a rebasing value applied to a selected transport stream. For example, the PTS may be timestamp segments that increment in a predetermined manner. As shown in the PTS sequence 600, the primary transport stream 110 may have an initial PTS of A+2X. In an exemplary implementation, the PTSs of the primary transport stream 110 may increment by a first value. For example, the PTSs may increment by X. Thus, a second PTS may have be A+3X. This may continue for each PTS in the primary transport stream 110. While the primary transport stream 110 is remuxed to generate the output 130, the PTSs of the primary transport stream 110 may correspond to PTSs of the output 130. A first PTS of the primary transport stream 110 that is used in a first PTS of the output 130 may have a first difference. The first difference may correspond to the rebasing value. As illustrated, a first rebasing value used to rebase the primary transport stream 110 to the output 130 may be delta_1. The rebasing engine 245 may use the determined rebasing value of delta_1 and apply it to each subsequent PTS of the primary transport stream 110 for a duration that the primary transport stream 110 is remuxed into the output 130. As illustrated, the primary transport stream 110 may be used for six PTSs in the output 130. Thus, the delta_1 being applied to the six PTSs of the primary transport stream 110 results in six PTSs of the output 130 having values of B, B+X, B+2X, ..., B+5X.

Due to various reasons (e.g., a restart of the secondary content source 115), a sequence of the PTSs of the primary transport stream 110 may not correspond to a sequence of the PTSs of the secondary transport stream 120. As illustrated, the first PTS of the primary transport stream 110 may have a value of A+2X while the first PTS of the secondary transport stream 120 may have a value of A. The secondary transport stream 120 may increment in a manner substantially similar to the primary transport stream 110. Thus, the second PTS of the secondary transport stream 120 may have a value of A+X and so forth. Therefore, the PTSs of the primary transport stream 110 and the secondary transport stream 120 may not be in parallel with another. However, the PTSs may still be aligned in the manner illustrated in the PTS sequence 600 where the first PTS of the primary transport stream 110 aligns with the first PTS of the secondary transport stream 120 and so forth. The resulting alignment of PTSs between the primary transport stream 110 and the secondary transport stream 120 may still be used since the rebasing engine 245 dynamically rebases PTSs used in the output 130.

As illustrated in the PTS sequence 600, the primary transport stream 110 may have terminated after the sixth PTS having a value of A+7X. Thus, by using the rebasing value of delta_1, the six PTSs of the output 130 may be determined. Starting with the seventh PTS of the output 130, the TSACO server 125 may remux the output 130 using the secondary transport stream 120. Thus, the seventh PTS and onward of the secondary transport stream 120 may be used in corresponding positions of the output 130. However, the same rebasing value as applied to the primary transport stream 110 may not be correct. Thus, the rebasing engine 245 may determine a second rebasing value to be applied to the PTSs of the secondary transport stream 120. Since the next PTS for the output 130 following the PTSs of the remuxed primary transport stream 110 is shown as having a value of B+6X, the rebasing engine 245 may determine the second rebasing value as delta_2 which is applied to the seventh PTS of the secondary transport stream 120 having a value of A+6X to result in B+6X. This process may continue in which the rebasing value of delta_2 is applied to each PTS of the secondary transport stream 120 that is used in remuxing to generate the output 130.

Using the rebasing value, the timestamps of the output 130 may also be properly determined to progress in the correct manner even when the PTSs of the primary transport stream 110 is no longer running in parallel to the PTSs of the secondary transport stream 120. In this manner, the frametime may enable the correct correlation of data to be used in remuxing to generate the output 130 when a switch is performed while the rebasing value may enable the correct correlation of timestamps for the output 130 when the remuxing is performed after the switch.

The exemplary embodiments described above are directed to the output system 100 including two content sources 105, 115 each generating transport streams 110, 120 which are received by the TSACO server 125 to generate the output 130 which is transmitted to an entity in the broadcast chain. However, the output system 100 may include further components and/or have various modifications. In a first example, as noted above, there may be further content sources and further transport streams that are received by the TSACO server 125. Thus, if the primary content source 105 fails such that the primary transport stream 110 is no longer received, the TSACO server 125 may use the secondary transport stream 120 from the secondary content source 115. If the secondary content source 115 fails such that the secondary transport stream 120 is no longer received and the primary content source 105 has not been restarted, the TSACO server 125 may use a tertiary transport stream (not shown) from a tertiary content source (not shown). If the secondary content source 115 fails such that the secondary transport stream 120 is no longer received and the primary content source 105 has been restarted, the TSACO server 125 may use the primary transport stream 110 or the tertiary transport stream. The output system 100 may therefore incorporate these further content sources and transport streams as redundant fallbacks to be used by the TSACO server 125. For example, if a particular transport stream is associated with a high priority or high revenue channel, this multiple redundancy configuration may ensure an intended playout in the output 130 even under significant failure conditions.

In a second example, there may be a plurality of output systems 100 that are integrated into an overall system. In a substantially similar way that the output system 100 is a converging, debranching, or merging scheme (collectively referred to as a "converging" scheme) in which multiple inputs result in a single output, the overall system may include a plurality of output systems 100 such that a plurality of outputs 130 from individual output systems 100 may be used as inputs much like the transport streams 110, 120. Thus, at a most divergent, highest level, each output system 100 may receive transport streams from content sources (e.g., as illustrated in FIG. 1). At a next lower level, there may be half the output systems 100 that reside on the immediately higher level. In this lower level, each output system 100 may receive a plurality of the outputs 130 from the output systems 100 in the higher level as remuxed transport streams. The output systems in the lower level may then generate respective outputs 130 as remuxed transport streams. This may continue until a lowest output system 100 that receives outputs 130 as remuxed transport streams to generate a final output 130. In this manner, the overall system may be equipped with redundant output systems 100 that provides a buffer that the exemplary embodiments may use to remux into a final output. That is, if a primary TSACO server 125 were to fail, there may be a secondary TSACO server 125 that provides an output 130 used in remuxing into a further output 130.

The output systems 100 in lower levels may also utilize the features described above with regard to frametime and rebasing. For example, the outputs 130 of different output systems 100 residing on a first level may have mismatching PCR and/or PTS values when received by an output system 100 residing on a second, lower level. However, the frametime operation and the rebasing operation may synchronize the outputs 130 from the first level such that the packets or frames buffered in the buffer 305 have known correlations. The PTSs may also be synchronized through the rebasing operation using respective rebasing values for each PTS.

The output system 100 may also be configured with monitoring features to provide alerts to an administrator. In a first example, the TSACO server 125 may read and process PAT/PMT packets to ensure that the correct PIDs in the primary transport stream 110 and the secondary transport stream 120 are included and/or match the PIDs in the TSACO server 125. If not included or mismatched, the TSACO server 125 may raise an error when either of the transport streams 110, 120 fails this verification. In a second example, the TSACO server 125 may monitor when the primary content source 105 and the secondary content source 115 are still operational or have failed using the various criteria indicated above. In a third example, the output system 100 may also generate an indication as to its own health and status. The output system 100 may communicate this information using, for example, representational state transfer (REST), simple network management protocol (SNMP), etc. The information may include buffer levels for each transport stream being received, a group of pictures (GOP) in the buffer, input jitter, missing input PIDs, unexpected PIDs, mismatched PMT/PAT, PCR/realtime jitter, etc.

The output system 100 may also utilize a preliminary clock synchronization operation so that extreme drift cases may be avoided. As noted above, the frametime operation and the rebasing operation enable a synchronization of the transport streams so that all of the components in the output system 100 may agree on a common time. Assuming a buffer overrun or underrun situation does not arise, the output system 100 may synchronize clocks based on the components of the output system 100 being configured with a network time protocol (NTP). NTP may keep the clocks synchronized with a reasonable threshold to keep the buffers from encountering significant error or drift.

Figure 7:
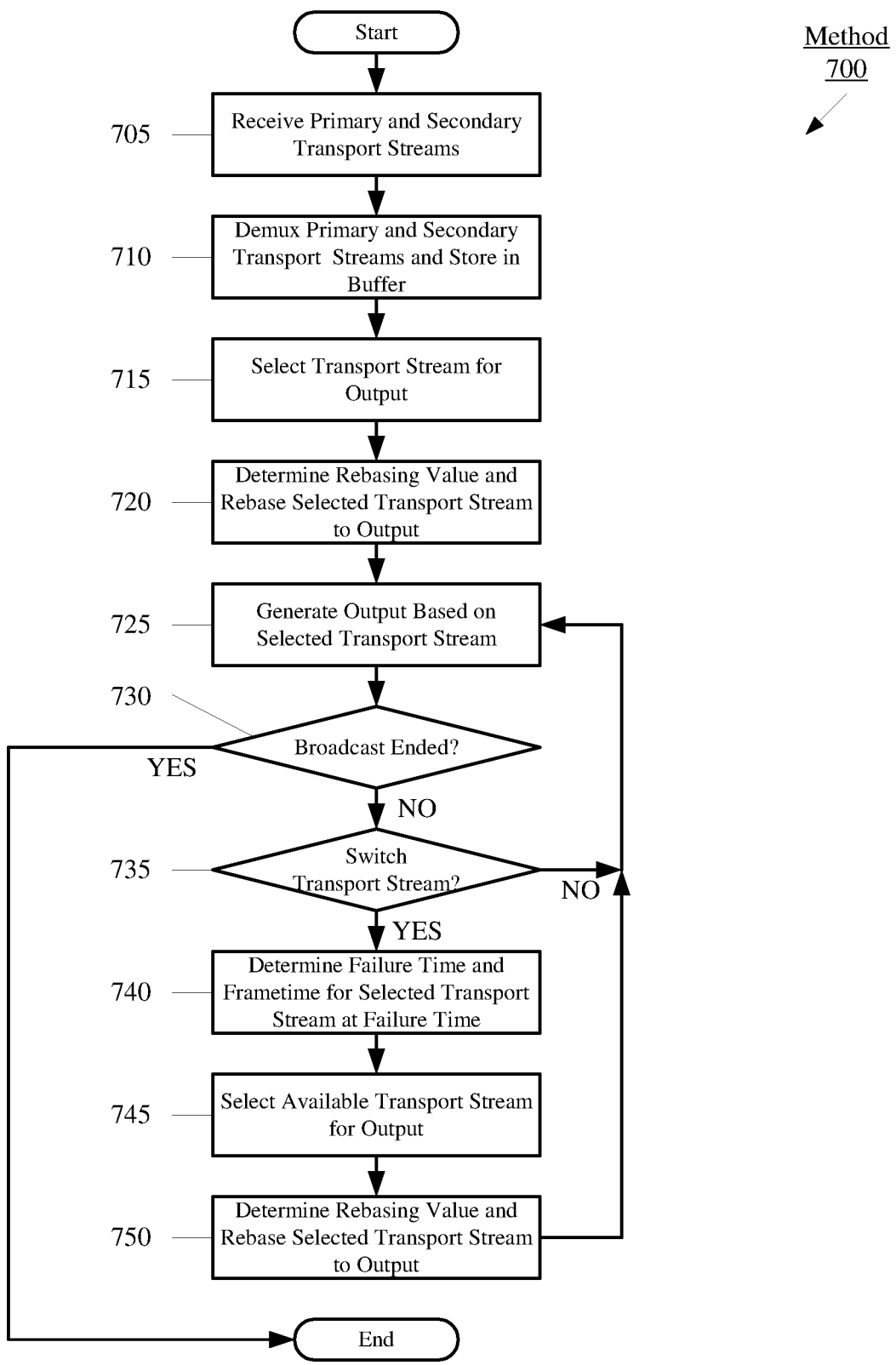
FIG. 7 shows an exemplary method to generate an output using a transport stream according to various exemplary embodiments described herein.

FIG. 7 shows an exemplary method 700 to generate the output 130 using the transport streams 110, 120 according to various exemplary embodiments described herein. The method 700 illustrates a manner in which to synchronize the packets of the transport streams 110, 120 using a frametime and properly convert timestamps when different transport streams are used in remuxing the output 130 through a rebasing operation. The method 700 may be performed by the selection engine 235, the frametime engine 240, the rebasing engine 245, the muxing engine 250 and/or other components of the TSACO server 125. The method 700 will be described with regard to the output system 100 of FIG. 1 and the TSACO server 125 of FIG. 2.

The method 700 is described from the perspective of the TSACO server 125. As described above, there may be operations that are performed without or with limited participation from the TSACO server 125. In a first example, there may be a synchrolock operation in which the primary content source 105 and the secondary content source 115 communicate with another such that each component is aware of the packets/frames/content items that are to be output in the transport streams. For example, the secondary content source 115 may request that a list of the content items to be played out by the primary content source 105 with corresponding start times be provided. In this manner, the secondary content source 115 may be synchrolocked to the primary content source 110. In another example, the primary content source 105, the secondary content source 115, and the TSACO server 125 may be configured to use NTP to synchronize the internal clocks within a reasonable threshold to prevent buffers from overrunning or underrunning. The method 700 may be performed with these operations having been performed.

The method 700 is also described with regard to the inputs (e.g., the primary transport stream 110, the secondary transport stream 120) to the TSACO server 125 being synchronized according to the exemplary embodiments such that a switch may be performed in a clean manner. However, the method 700 may be modified to incorporate an input from a foreign source. For example, the input may not be synchronized and/or may not include information to perform a switch in a clean manner (e.g., a splice location). Under these conditions, the method 700 may incorporate a fallback switch process in which a simple switch operation is used that may introduce an artifact, a glitch, etc.

In 705, the TSACO server 125 receives the primary transport stream 110 from the primary content source 105 and the secondary transport stream 120 from the secondary content source 115. As described above, the transport streams 110, 120 may be transmitted to the TSACO server 125 using any communication mechanism using device based communications, intra-device communications, cloud/virtual machine communications, etc. In 710, the TSACO server 125 demuxes the transport streams 110, 120 and stores the packets or frames in a buffer (e.g., buffer 305). For illustrative purposes, in the method 700, the demuxed transport streams 110, 120 will be described in the context of frames.

In 715, the TSACO server 125 selects a transport stream to be remuxed in generating the output 130. The TSACO server 125 may select the transport stream based on a variety of criteria. In a first example, the TSACO server 125 may determine available transport streams. If only one transport stream is available, the TSACO server 125 may select the only available transport stream. When multiple transport streams are available, further criteria may be considered. In a second example, the TSACO server 125 may utilize a priority or hierarchy associated with the available transport streams. For example, the primary transport stream 110 may have a higher priority than the secondary transport stream 120. Thus, the TSACO server 125 may select the primary transport stream 110 over the secondary transport stream 120 when both are available. In a third example, the TSACO server 125 may utilize transmission statistics to select an available transport stream. For example, when a stronger connection exists between the TSACO server 125 and the primary content source 105 over the connection between the TSACO server 125 and the secondary content source 115, the TSACO server 125 may select the primary transport stream 110 which may have, for example, a higher likelihood of being received properly. For illustrative purposes, the TSACO server 125 may select the primary transport stream 110.

In 720, the TSACO server 125 determines a rebasing value for PTSs of the selected primary transport stream 110 to correspond to PTSs of the output 130. As described above, the output 130 may have PTSs that correspond to PTSs of the transport being used to remux into the output 130. Thus, the TSACO server 125 may determine a first rebasing value to be applied to each PTS that is used in the output 130. In 725, the TSACO server 125 generates the output 130 based on the selected primary transport stream 110 with the rebased PTSs.

In 730, the TSACO server 125 determines whether a broadcast or transmission associated with the output 130 has concluded. When the broadcast is of a finite or limited nature, the TSACO server 125 may conclude the broadcast when the output 130 has terminated. However, those skilled in art will understand that broadcasts may also be continuous. Thus, the TSACO server 125 may continue to transmit the output 130. When the broadcast is continuous or a portion of the broadcast remains to be played out, the TSACO server 125 continues to 735.

In 735, the TSACO server 125 determines whether to switch the selected transport stream. As described above, there may be various reasons to switch the selected transport stream. For example, the reason may be the content source providing the selected transport stream failing. Further examples may include switching to a backup transport stream proactively to perform maintenance equipment associated with a currently selected transport stream (e.g., server upgrade, patches, etc.), a buffer being too low, missing PIDs, packet loss, jitter levels being high, etc. If the TSACO server 125 determines that the selected transport stream is to continue being used, the TSACO server 125 returns to 725. However, if the TSACO server 125 determines that a new transport stream is to be selected, the TSACO server 125 continues to 740.

In 740, the TSACO server 125 determines a failure time (or frame) at which the selected primary transport stream 110 is to be discontinued in remuxing for the output 130. A corresponding frametime may be determined based on the failure time so that a corresponding frame or packet of the transport stream is identified (e.g., using a start time and a completed progression). In 745, the TSACO server 125 selects an available remaining transport stream. For illustrative purposes, the TSACO server 125 may select the secondary transport stream 120. Once the secondary transport stream 120 is selected to continue remuxing for the output 130, the frametime determined using the previously selected primary transport stream 110 may be used to determine the proper position in the selected secondary transport stream 120 since the buffered frames are synchronized via the frametime. In 750, the TSACO server 125 determines a further rebasing value that is to be applied for the selected secondary transport stream 120 such that the PTS continue in a seamless manner after the switch. Subsequently, the TSACO server 125 returns to 725 to generate the output 130 based on the selected secondary transport stream 120.

The exemplary embodiments provide a device, system, and method of performing an automatic change over from a first transport stream to a second transport stream when generating an output for broadcast. When implementing a switch using transport streams, the physical components used in conventional systems are not available to perform a seamless change over. Accordingly, the exemplary embodiments introduce a frametime so that packets that are buffered for remuxing are synchronized with one another so that a switch from a currently selected transport stream to a transport stream to be selected is performed in a clean manner (e.g., seamlessly, no artifacts, no glitches, etc.). The exemplary embodiments also enable a timestamp to be correlated using a rebasing operation to compensate for timestamp issues arising from content sources drifting or restarting.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made to the present disclosure, without departing from the spirit or the scope of the exemplary embodiments. Thus, it is intended that the present disclosure cover modifications and variations of the exemplary embodiments invention provided they come within the scope of the appended claims and their equivalent.

What is claimed is:

1. A method, comprising:
    at an output server:
        demuxing each of a plurality of transport streams;
        generating a first portion of an output based on a first one of the transport streams by remuxing the demuxed transport stream of the first transport stream;
        determining a frametime to synchronize first packets of the first transport stream to second packets of a second one of the transport streams, the frametime being based on a completed progression of a content item using the first transport stream;
        identifying an initial second transport stream frame subsequent to a final frame represented by the completed progression of the content item using the first transport stream;
        generating a second portion of the output starting at the initial second transport stream frame by remuxing at least a portion of the demuxed transport stream of the second transport stream; and
        applying a first rebasing value to the first transport stream when generating the first portion of the output, wherein the first rebasing value is based on a difference between a program timestamp (PTS) of the first transport stream to a PTS of the output.

2. The method of claim 1, further comprising applying the first rebasing value to the second transport stream when generating the second portion of the output wherein the first rebasing value is based on a difference between a program timestamp (PTS) of the second transport stream relative to a PTS of the output.

3. The method of claim 1, wherein the first transport stream is received from a first content source and the second transport stream is received from a second content source.

4. The method of claim 1, further comprising synchronizing a first internal clock of the output server with a second internal clock associated with the first transport stream and a third internal clock associated with the second transport stream within a predetermined threshold based on a network time protocol (NTP).

5. The method of claim 1, further comprising prior to the step of selecting the second transport stream, determining whether to perform a switch from the first transport stream to the second transport stream.

6. The method of claim 2, further comprising:
    determining a first input timestamp for a first input packet of the first transport stream;
    determining a first output timestamp for a first output packet of the output; and
    employing the first rebasing value to adjust the first input timestamp to correspond to the first output timestamp, wherein the first rebasing value is applied to each input packet of the first transport stream used in the first portion.

7. The method of claim 6, further comprising:
    determining a second input timestamp for a second input packet of the second transport stream;
    determining a second output timestamp for a first for a second output packet of the output; and
    determining a second rebasing value to adjust the second input timestamp to correspond to the second output timestamp, wherein the second rebasing value is applied to each input packet of the second transport stream used in the second portion.

8. The method of claim 3, wherein the first and second content sources exchange playout information which include the content item and a start time of the content item.

9. The method of claim 5, wherein each of the demuxed transport streams is stored in a respective buffer and wherein the switch is performed based on a failure of the first transport stream, a buffer level of the first transport stream, a group of pictures (GOPs) in a buffer of the first transport stream, an input jitter, missing input program identifiers (PIDs), an unexpected PID, a mismatched program map table (PMT), a mismatched program association table (PAT), a program clock reference (PCR), a realtime jitter, a maintenance issue, or a combination thereof.

10. An output server, comprising:
    a memory arrangement; and
    a processor configured to demux a first one of a plurality of transport streams and generate a first portion of an output based on the first transport stream by remuxing the demuxed first transport stream, the processor further configured to select a second transport stream from the plurality of transport streams and determine a frametime to synchronize first packets of the first transport stream to second packets of the second transport stream, the frametime being based on a completed progression of a content item using the first transport stream, the processor further configured to determine a location in the second transport stream corresponding to an initial second transport stream frame subsequent to a final frame represented by the completed progression of the content item using the first transport stream, the processor further configured to generate a second portion of the output based on the second transport stream starting at the initial second transport stream frame by remuxing at least a portion of the demuxed second transport stream, the processor being further configured to apply a first rebasing value to the second transport stream when generating the second portion of the output, wherein the first rebasing value is based on a difference between a program timestamp (PTS) of the first transport stream and the second transport stream relative to a PTS of the output.

11. The output server of claim 10, wherein the processor is further configured to determine a first input timestamp for a first input packet of the first transport stream, determine a first output timestamp for a first output packet of the output, and determine a second rebasing value to adjust the first input timestamp to correspond to the first output timestamp, and wherein the second rebasing value is applied to each input packet of the first transport stream used in the first portion.

12. The output server of claim 10, wherein the first transport stream is received from a first content source and the second transport stream is received from a second content source.

13. The output server of claim 10, wherein the processor further synchronizes a first internal clock of the output server with a second internal clock associated with the first transport stream and a third internal clock associated with the second transport stream within a predetermined threshold based on a network time protocol (NTP).

14. The output server of claim 10, wherein, prior to the processor selecting the second transport stream, the processor is further configured to determine whether to perform a switch from the first transport stream to the second transport stream.

15. The output server of claim 11, wherein the processor is further configured to determine a second input timestamp for a second input packet of the second transport stream, determine a second output timestamp for a second output packet of the output, and determine a third rebasing value to adjust the second input timestamp to correspond to the second output timestamp, and wherein the third rebasing value is applied to each input packet of the second transport stream used in the second portion.

16. The output server of claim 12, wherein the first and second content sources exchange playout information including the content item and a start time of the content item.

17. An apparatus, comprising a processing circuitry configured to:
  demux each of a plurality of transport streams;
  generate a first portion of an output based on a first one of the plurality of transport streams by remuxing the demuxed transport stream of the first transport stream;
  determine a frametime to synchronize first packets of the first transport stream to second packets of a second one of the plurality of transport streams, the frametime being based on a completed progression of a content item using the first transport stream;
  determine a location in the second transport stream corresponding to an initial second transport stream frame subsequent to a final frame represented by the completed progression of the content item using the first transport stream;
  generate a second portion of the output starting at the initial second transport stream frame by remuxing at least a portion of the demuxed transport stream of the second transport stream; and
  apply a first rebasing value to at least one of the first transport stream when generating the first portion of the output or the second transport stream when generating the second portion of the output, wherein the first rebasing value is based on a difference between a program timestamp (PTS) of the first transport stream or the second transport stream relative to a PTS of the output.

* * * * *